(12) United States Patent
Ballamkonda et al.

(10) Patent No.: US 6,775,682 B1
(45) Date of Patent: Aug. 10, 2004

(54) EVALUATION OF ROLLUPS WITH DISTINCT AGGREGATES BY USING SEQUENCE OF SORTS AND PARTITIONING BY MEASURES

(75) Inventors: Srikanth Ballamkonda, Sunnyvale, CA (US); Abhinav Gupta, Palo Alto, CA (US); Andrew Witkowski, Foster Ctiy, CA (US)

(73) Assignee: Oracle International Corporation, Redwood Shores, CA (US)

( * ) Notice: Subject to any disclaimer, the term of this patent is extended or adjusted under 35 U.S.C. 154(b) by 389 days.

(21) Appl. No.: 10/084,642

(22) Filed: Feb. 26, 2002

(51) Int. Cl.[7] .............................................. G06F 17/30
(52) U.S. Cl. ....................................................... 707/102
(58) Field of Search ............................. 707/102, 1, 2, 707/3, 4, 5

(56) References Cited

U.S. PATENT DOCUMENTS

| | | | | |
|---|---|---|---|---|
| 5,469,568 A | * | 11/1995 | Schiefer et al. ................. | 707/2 |
| 5,943,666 A | * | 8/1999 | Kleewein et al. ............... | 707/2 |
| 6,298,342 B1 | * | 10/2001 | Graefe et al. ................... | 707/4 |
| 6,341,281 B1 | * | 1/2002 | MacNicol et al. .............. | 707/3 |
| 6,345,267 B1 | * | 2/2002 | Lohman et al. ................. | 707/2 |
| 2003/0208484 A1 | * | 11/2003 | Chang et al. .................... | 707/5 |

* cited by examiner

*Primary Examiner*—Diane D. Mizrahi
(74) *Attorney, Agent, or Firm*—Hickman Palermo Truong & Becker LLP; John D. Henkhaus

(57) ABSTRACT

Methods are provided for efficiently evaluating database queries including a rollup operator and a distinct aggregate function. Using a sequence of sorts, duplicate record elimination performed on previous sorts at lower, or finer, levels of the rollup operator is taken advantage of by performing subsequent sorts on the preceding sort. Hence, when moving from one rollup level to the next higher level, there are fewer data records to sort with respect to the relevant grouping columns for that level, and thus also fewer duplicate data records to eliminate for purposes of computing the distinct aggregate. Using parallel evaluation, processing of aggregate functions is split among different processing slaves, and the measure of an aggregate function is included as a partitioning key when sending data from one data flow operation to the next data flow operation of a query execution plan. Using parallel evaluation for a query that includes two or more aggregate functions, a measure code corresponding with each aggregate function and associated measure values are included as partitioning keys for enhanced load balancing and parallelization.

28 Claims, 20 Drawing Sheets

TIME 102

| YEAR | QUARTER | MONTH | SALES |
|------|---------|-------|-------|
| 1999 | 1 | 1 | 10 |
| 1999 | 2 | 3 | 20 |
| 1999 | 2 | 3 | 20 |
| 1999 | 1 | 1 | 20 |
| 1999 | 1 | 2 | 10 |
| 1999 | 1 | 1 | 10 |
| 1999 | 1 | 2 | 10 |
| 1999 | 2 | 3 | 40 |
| 1999 | 3 | 1 | 30 |
| 1999 | 4 | 2 | 50 |
| 1999 | 4 | 2 | 50 |
| 1999 | 3 | 3 | 40 |
| 2000 | 2 | 3 | 40 |
| 2000 | 1 | 2 | 20 |
| 2000 | 1 | 2 | 20 |
| 2000 | 2 | 3 | 40 |
| 2000 | 1 | 1 | 10 |
| 2000 | 2 | 3 | 20 |
| 2000 | 3 | 3 | 30 |

FIG. 1A

TIME1                                             104

| YEAR | QUARTER | MONTH | SALES |
|------|---------|-------|-------|
| 1999 | 1 | 1 | 10 |
| 1999 | 1 | 1 | 10 |
| 1999 | 1 | 1 | 20 |
| 1999 | 1 | 2 | 10 |
| 1999 | 1 | 2 | 10 |
| 1999 | 2 | 3 | 20 |
| 1999 | 2 | 3 | 20 |
| 1999 | 2 | 3 | 40 |
| 1999 | 3 | 1 | 30 |
| 1999 | 3 | 3 | 40 |
| 1999 | 4 | 2 | 50 |
| 1999 | 4 | 2 | 50 |
| 2000 | 1 | 1 | 10 |
| 2000 | 1 | 2 | 20 |
| 2000 | 1 | 2 | 20 |
| 2000 | 2 | 3 | 20 |
| 2000 | 2 | 3 | 40 |
| 2000 | 2 | 3 | 40 |
| 2000 | 3 | 3 | 30 |

FIG. 1B

TIME2        106

| YEAR | QUARTER | MONTH | SALES |
|---|---|---|---|
| 1999 | 1 | 1 | 10 |
| 1999 | 1 | 1 | 20 |
| 1999 | 1 | 2 | 10 |
| 1999 | 2 | 3 | 20 |
| 1999 | 2 | 3 | 40 |
| 1999 | 3 | 1 | 30 |
| 1999 | 3 | 3 | 40 |
| 1999 | 4 | 2 | 50 |
| 2000 | 1 | 1 | 10 |
| 2000 | 1 | 2 | 20 |
| 2000 | 2 | 3 | 20 |
| 2000 | 2 | 3 | 40 |
| 2000 | 3 | 3 | 30 |

162 { rows 1–2
164 { rows 4–5
166 { rows 11–12

FIG. 1C

TIME3        108

| YEAR | QUARTER | MONTH | SUM(DISTINCT SALES) |
|---|---|---|---|
| 1999 | 1 | 1 | 30 |
| 1999 | 1 | 2 | 10 |
| 1999 | 2 | 3 | 60 |
| 1999 | 3 | 1 | 30 |
| 1999 | 3 | 3 | 40 |
| 1999 | 4 | 2 | 50 |
| 2000 | 1 | 1 | 10 |
| 2000 | 1 | 2 | 20 |
| 2000 | 2 | 3 | 60 |
| 2000 | 3 | 3 | 30 |

168 — row 1
170 — row 3
172 — row 9

FIG. 1D

TIME4                                110

| YEAR | QUARTER | SALES |
|------|---------|-------|
| 1999 | 1 | 10 |
| 1999 | 1 | 20 |
| 1999 | 2 | 20 |
| 1999 | 2 | 40 |
| 1999 | 3 | 30 |
| 1999 | 3 | 40 |
| 1999 | 4 | 50 |
| 2000 | 1 | 10 |
| 2000 | 1 | 20 |
| 2000 | 2 | 20 |
| 2000 | 2 | 40 |
| 2000 | 3 | 30 |

TIME5                                112

| YEAR | QUARTER | SUM(DISTINCT SALES) |
|------|---------|---------------------|
| 1999 | 1 | 30 |
| 1999 | 2 | 60 |
| 1999 | 3 | 70 |
| 1999 | 4 | 50 |
| 2000 | 1 | 30 |
| 2000 | 2 | 60 |
| 2000 | 3 | 30 |

TIME6 114

| YEAR | SALES |
|---|---|
| 1999 | 10 |
| 1999 | 20 |
| 1999 | 30 |
| 1999 | 40 |
| 1999 | 50 |
| 2000 | 10 |
| 2000 | 20 |
| 2000 | 30 |
| 2000 | 40 |

FIG. 1G

TIME8 118

| SALES |
|---|
| 10 |
| 20 |
| 30 |
| 40 |
| 50 |

FIG. 1I

TIME7 116

| YEAR | SUM(DISTINCT SALES) |
|---|---|
| 1999 | 150 |
| 2000 | 100 |

FIG. 1H

TIME9 120

| SUM(DISTINCT SALES) |
|---|
| 150 |

FIG. 1J

TIME_P0    204    254    256

| YEAR | QUARTER | MONTH | CODE | VALUE | |
|------|---------|-------|------|-------|---|
| 1999 | 1 | 1 | 1 | 10 | 258 |
| 1999 | 1 | 1 | 2 | 4 | |
| 1999 | 1 | 1 | 1 | 10 | 260 |
| 1999 | 1 | 1 | 2 | 3 | |
| 1999 | 1 | 1 | 1 | 10 | 262 |
| 1999 | 1 | 1 | 2 | 6 | 264 |
| 1999 | 1 | 1 | 1 | 20 | |
| 1999 | 1 | 1 | 2 | 6 | 266 |
| 1999 | 1 | 2 | 1 | 10 | |
| 1999 | 1 | 2 | 2 | 3 | |
| 1999 | 2 | 3 | 1 | 20 | |
| 1999 | 2 | 3 | 2 | 10 | 268 |
| 1999 | 2 | 3 | 1 | 40 | 272 |
| 1999 | 2 | 3 | 2 | 10 | 270 |
| 1999 | 2 | 3 | 1 | 40 | 274 |
| 1999 | 2 | 3 | 2 | 20 | |
| 1999 | 3 | 1 | 1 | 30 | |
| 1999 | 3 | 1 | 2 | 20 | |
| 1999 | 4 | 2 | 1 | 50 | |
| 1999 | 4 | 2 | 2 | 20 | |

FIG. 2B

TIME_P1     206

| YEAR | QUARTER | MONTH | CODE | VALUE | |
|---|---|---|---|---|---|
| 1999 | 3 | 3 | 1 | 40 | |
| 1999 | 3 | 3 | 2 | 10 | |
| 1999 | 4 | 2 | 1 | 20 | |
| 1999 | 4 | 2 | 2 | 10 | |
| 2000 | 1 | 1 | 1 | 10 | |
| 2000 | 1 | 1 | 2 | 6 | |
| 2000 | 1 | 2 | 1 | 10 | |
| 2000 | 1 | 2 | 2 | 3 | ← 276 |
| 2000 | 1 | 2 | 1 | 20 | |
| 2000 | 1 | 2 | 2 | 3 | ← 278 |
| 2000 | 2 | 3 | 1 | 40 | ← 280 |
| 2000 | 2 | 3 | 2 | 20 | ← 286 |
| 2000 | 2 | 3 | 1 | 40 | ← 282 |
| 2000 | 2 | 3 | 2 | 20 | ← 288 |
| 2000 | 2 | 3 | 1 | 40 | ← 284 |
| 2000 | 2 | 3 | 2 | 6 | |
| 2000 | 3 | 3 | 1 | 40 | |
| 2000 | 3 | 3 | 2 | 10 | ← 290 |
| 2000 | 3 | 3 | 1 | 30 | |
| 2000 | 3 | 3 | 2 | 10 | ← 292 |

Columns 254 (CODE) and 256 (VALUE)

FIG. 2C

TIME_P0_OUT 208

| YEAR | QUARTER | MONTH | CODE | VALUE |
|------|---------|-------|------|-------|
| 1999 | 1 | 1 | 1 | 10 |
| 1999 | 1 | 1 | 1 | 20 |
| 1999 | 1 | 1 | 2 | 3 |
| 1999 | 1 | 1 | 2 | 4 |
| 1999 | 1 | 1 | 2 | 6 |
| 1999 | 1 | 2 | 1 | 10 |
| 1999 | 1 | 2 | 2 | 3 |
| 1999 | 2 | 3 | 1 | 20 |
| 1999 | 2 | 3 | 1 | 40 |
| 1999 | 2 | 3 | 2 | 10 |
| 1999 | 2 | 3 | 2 | 20 |
| 1999 | 3 | 1 | 1 | 30 |
| 1999 | 3 | 1 | 2 | 20 |
| 1999 | 4 | 2 | 1 | 50 |
| 1999 | 4 | 2 | 2 | 20 |

FIG. 2D

TIME_P1_OUT                                                210

| YEAR | QUARTER | MONTH | CODE | VALUE |
|------|---------|-------|------|-------|
| 1999 | 3 | 3 | 1 | 40 |
| 1999 | 3 | 3 | 2 | 10 |
| 1999 | 4 | 2 | 1 | 20 |
| 1999 | 4 | 2 | 2 | 10 |
| 2000 | 1 | 1 | 1 | 10 |
| 2000 | 1 | 1 | 2 | 6 |
| 2000 | 1 | 2 | 1 | 10 |
| 2000 | 1 | 2 | 1 | 20 |
| 2000 | 1 | 2 | 2 | 3 |
| 2000 | 2 | 3 | 1 | 40 |
| 2000 | 2 | 3 | 2 | 6 |
| 2000 | 2 | 3 | 2 | 20 |
| 2000 | 3 | 3 | 1 | 30 |
| 2000 | 3 | 3 | 1 | 40 |
| 2000 | 3 | 3 | 2 | 10 |

FIG. 2E

TIME_P2_IN                                      212

| YEAR | QUARTER | MONTH | CODE | VALUE |
|------|---------|-------|------|-------|
| 1999 | 1 | 1 | 1 | 10 |
| 1999 | 1 | 1 | 2 | 6 |
| 1999 | 1 | 2 | 1 | 10 |
| 1999 | 2 | 3 | 1 | 40 |
| 1999 | 2 | 3 | 2 | 10 |
| 1999 | 3 | 3 | 1 | 40 |
| 1999 | 3 | 3 | 2 | 10 |
| 1999 | 4 | 2 | 1 | 50 |
| 1999 | 4 | 2 | 2 | 10 |
| 2000 | 1 | 1 | 1 | 10 |
| 2000 | 1 | 1 | 2 | 6 |
| 2000 | 1 | 2 | 1 | 10 |
| 2000 | 2 | 3 | 1 | 10 |
| 2000 | 2 | 3 | 1 | 40 |
| 2000 | 2 | 3 | 2 | 6 |
| 2000 | 3 | 3 | 1 | 40 |
| 2000 | 3 | 3 | 2 | 10 |

FIG. 2F

TIME_P3_IN 214

| YEAR | QUARTER | MONTH | CODE | VALUE |
|---|---|---|---|---|
| 1999 | 1 | 1 | 1 | 20 |
| 1999 | 1 | 1 | 2 | 3 |
| 1999 | 1 | 1 | 2 | 4 |
| 1999 | 1 | 2 | 2 | 3 |
| 1999 | 2 | 3 | 1 | 20 |
| 1999 | 2 | 3 | 2 | 20 |
| 1999 | 3 | 1 | 1 | 30 |
| 1999 | 3 | 1 | 2 | 20 |
| 1999 | 4 | 2 | 1 | 20 |
| 1999 | 4 | 2 | 2 | 20 |
| 2000 | 1 | 2 | 1 | 20 |
| 2000 | 1 | 2 | 2 | 3 |
| 2000 | 2 | 3 | 2 | 20 |
| 2000 | 3 | 3 | 1 | 30 |

FIG. 2G

TIME_P2_OUT                                                  216

| YEAR | QUARTER | MONTH | SUM(DISTINCT SALES) | COUNT(DISTINCT PROFITS) |
|------|---------|-------|---------------------|-------------------------|
| 1999 | 1       | 1     | 10                  | 6                       |
| 1999 | 1       | 2     | 10                  | NULL                    |
| 1999 | 2       | 3     | 40                  | 10                      |
| 1999 | 3       | 3     | 40                  | 10                      |
| 1999 | 4       | 2     | 50                  | 10                      |
| 2000 | 1       | 1     | 10                  | 6                       |
| 2000 | 1       | 2     | 10                  | NULL                    |
| 2000 | 2       | 3     | 40                  | 6                       |
| 2000 | 3       | 3     | 40                  | 10                      |

FIG. 2H

TIME_P3_OUT                                                  218

| YEAR | QUARTER | MONTH | SUM(DISTINCT SALES) | COUNT(DISTINCT PROFITS) |
|------|---------|-------|---------------------|-------------------------|
| 1999 | 1       | 1     | 20                  | 2                       |
| 1999 | 1       | 2     | NULL                | 1                       |
| 1999 | 2       | 3     | 20                  | 1                       |
| 1999 | 3       | 1     | 30                  | 1                       |
| 1999 | 4       | 2     | 20                  | 1                       |
| 2000 | 1       | 2     | 20                  | 1                       |
| 2000 | 2       | 3     | NULL                | 1                       |
| 2000 | 3       | 3     | 30                  | NULL                    |

FIG. 2I

TIME_P2_IN1                                           220

| YEAR | QUARTER | CODE | VALUE |
|------|---------|------|-------|
| 1999 | 1 | 1 | 10 |
| 1999 | 1 | 1 | 10 |
| 1999 | 1 | 2 | 6 |
| 1999 | 2 | 1 | 40 |
| 1999 | 2 | 2 | 10 |
| 1999 | 3 | 1 | 40 |
| 1999 | 3 | 2 | 10 |
| 1999 | 4 | 1 | 50 |
| 1999 | 4 | 2 | 10 |
| 2000 | 1 | 1 | 10 |
| 2000 | 1 | 1 | 10 |
| 2000 | 1 | 2 | 6 |
| 2000 | 2 | 1 | 10 |
| 2000 | 2 | 1 | 40 |
| 2000 | 2 | 2 | 6 |
| 2000 | 3 | 1 | 40 |
| 2000 | 3 | 2 | 10 |

FIG. 2J

TIME_P2_OUT1                                          222

| YEAR | QUARTER | SUM(DISTINCT SALES) | COUNT(DISTINCT PROFITS) |
|------|---------|---------------------|-------------------------|
| 1999 | 1 | 10 | 6 |
| 1999 | 2 | 40 | 10 |
| 1999 | 3 | 40 | 10 |
| 1999 | 4 | 50 | 10 |
| 2000 | 1 | 10 | 6 |
| 2000 | 2 | 50 | 6 |
| 2000 | 3 | 40 | 10 |

FIG. 2K

TIME_P3_IN1                                          224

| YEAR | QUARTER | CODE | VALUE |
|---|---|---|---|
| 1999 | 1 | 1 | 20 |
| 1999 | 1 | 2 | 3 |
| 1999 | 1 | 2 | 3 |
| 1999 | 1 | 2 | 4 |
| 1999 | 2 | 1 | 20 |
| 1999 | 2 | 2 | 20 |
| 1999 | 3 | 1 | 30 |
| 1999 | 3 | 2 | 20 |
| 1999 | 4 | 1 | 20 |
| 1999 | 4 | 2 | 20 |
| 2000 | 1 | 1 | 20 |
| 2000 | 1 | 2 | 3 |
| 2000 | 2 | 2 | 20 |
| 2000 | 3 | 1 | 30 |

FIG. 2L

TIME_P3_OUT1                                         226

| YEAR | QUARTER | SUM(DISTINCT SALES) | COUNT(DISTINCT PROFITS) |
|---|---|---|---|
| 1999 | 1 | 20 | 2 |
| 1999 | 2 | 20 | 1 |
| 1999 | 3 | 30 | 1 |
| 1999 | 4 | 20 | 1 |
| 2000 | 1 | 20 | 1 |
| 2000 | 2 | NULL | 1 |
| 2000 | 3 | 30 | NULL |

FIG. 2M

TIME_P2_IN2                    228

| YEAR | CODE | VALUE |
|------|------|-------|
| 1999 | 1 | 10 |
| 1999 | 1 | 10 |
| 1999 | 1 | 40 |
| 1999 | 1 | 40 |
| 1999 | 1 | 50 |
| 1999 | 2 | 6 |
| 1999 | 2 | 10 |
| 1999 | 2 | 10 |
| 1999 | 2 | 10 |
| 2000 | 1 | 10 |
| 2000 | 1 | 10 |
| 2000 | 1 | 10 |
| 2000 | 1 | 40 |
| 2000 | 1 | 40 |
| 2000 | 2 | 6 |
| 2000 | 2 | 6 |
| 2000 | 2 | 10 |

FIG. 2N

TIME_P2_OUT2                    230

| YEAR | SUM(DISTINCT SALES) | COUNT(DISTINCT PROFITS) |
|------|---------------------|-------------------------|
| 1999 | 100 | 2 |
| 2000 | 50  | 2 |

FIG. 2O

TIME_P3_IN2    232

| YEAR | CODE | VALUE |
|---|---|---|
| 1999 | 1 | 20 |
| 1999 | 1 | 20 |
| 1999 | 1 | 20 |
| 1999 | 1 | 30 |
| 1999 | 2 | 3 |
| 1999 | 2 | 3 |
| 1999 | 2 | 4 |
| 1999 | 2 | 20 |
| 1999 | 2 | 20 |
| 1999 | 2 | 20 |
| 2000 | 1 | 20 |
| 2000 | 1 | 30 |
| 2000 | 2 | 3 |
| 2000 | 2 | 20 |

FIG. 2P

TIME_P3_OUT2    234

| YEAR | SUM(DISTINCT SALES) | COUNT(DISTINCT PROFITS) |
|---|---|---|
| 1999 | 50 | 3 |
| 2000 | 50 | 2 |

FIG. 2Q

TIME_OUTPUT1                                                  236

| YEAR | QUARTER | SUM(DISTINCT SALES) | COUNT(DISTINCT PROFITS) |
|------|---------|---------------------|-------------------------|
| 1999 | 1       | 30                  | 3                       |
| 1999 | 2       | 60                  | 2                       |
| 1999 | 3       | 70                  | 2                       |
| 1999 | 4       | 70                  | 2                       |
| 2000 | 1       | 30                  | 2                       |
| 2000 | 2       | 40                  | 2                       |
| 2000 | 3       | 70                  | 1                       |

FIG. 2R

TIME_OUTPUT2                                                  238

| YEAR | SUM(DISTINCT SALES) | COUNT(DISTINCT PROFITS) |
|------|---------------------|-------------------------|
| 1999 | 150                 | 5                       |
| 2000 | 100                 | 4                       |

FIG. 2S

EVALUATION OF ROLLUPS WITH DISTINCT AGGREGATES BY USING SEQUENCE OF SORTS AND PARTITIONING BY MEASURES

CROSS REFERENCE TO RELATED APPLICATIONS

This application is related to commonly owned U.S. patent application Ser. No. 10/084,597 filed on Feb. 26, 2002, entitled "Evaluation of Grouping Sets By Reduction to Group-By Clause, With or Without a Rollup Operator, Using Temporary Tables", and U.S. patent application Ser. No. 10/077,828 filed on Feb. 15, 2002, entitled "Evaluation of Hierarchical Cubes By Nesting Rollups", which are incorporated by reference herein in their entirety for all purposes.

FIELD OF THE INVENTION

The present invention relates generally to database management systems and, more specifically, to techniques for efficiently evaluating database queries including rollups and distinct aggregates.

BACKGROUND OF THE INVENTION

In a database management system (DBMS), data is stored in one or more data containers, each container contains records, and the data within each record is organized into one or more fields. In relational database management systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Database management systems retrieve information in response to receiving queries that specify the information to retrieve. In order for a database management system to understand the query, the query should conform to a database language recognized by the database management system, such as the Structured Query Language (SQL).

In an OLAP (on-line analytical processing) environment or a data warehousing environment, data is often organized into a star schema. A star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables". Typically, each dimension has "levels" which correspond to columns of the dimension table, which are organized in a hierarchical manner. For example, a TIME dimension might consist of the levels year, quarter, month, and day, corresponding to columns of the TIME table. The hierarchical organization is such that years consist of quarters, quarters consist of months, and months consist of days.

AGGREGATE FUNCTION

An important function for data generation and retrieval performed by a database management system is the generation of aggregated information. Aggregated information is information derived by applying an aggregate function to the values in a column of a subset of rows in a table or on the result of a join of two or more tables. Examples of aggregate functions are functions that sum values, calculate averages, and determine minimum and maximum values. The column that contains the values to which an aggregate function is applied is referred to as the measure.

The subsets of rows to which an aggregate function is applied are determined by values in "group-by" columns. The aggregate information generated by a database management system is presented as a result set having the group-by column(s) and the aggregated measure column. In particular, the result set has one row for each unique value in the group-by column. Each row in the result set corresponds to the group of rows in the base table containing the value for the group-by column of the row. The measure column in the row contains the output of the aggregate function applied to the values in the measure column of the group of rows.

Aggregate information is generated by a database management system in response to receiving an aggregate query. An aggregate query specifies a group-by column, the aggregate measure column, and the aggregate function to apply to the measure values. The following query is provided as an illustration.

SELECT d, SUM(s) sum_s
FROM t
GROUP BY d

Table t contains data representing the sales of an organization. Each row represents a particular sales transaction. For a particular row in table t, column d contains the date of the sales transaction, and s contains the sale amount.

The SELECT clause contains "SUM(s)", which specifies that the aggregate function "sum" is to be applied to the values in column s (aggregate measure) of table t. The query also includes the group-by clause "GROUP BY d", which denotes column d as the group-by column.

Execution of this query generates a result set with a column for d and a column for sum (s). A particular row in the result set represents the total sales (s) for all sale transactions in a given day (d). Specifically, for a particular row in the result set, d contains a unique date value from table t for column d. Column sum_s contains the sum of the sales amount values in column s for the group of rows from t that have the unique date value in column d.

It is often useful to generate aggregate information grouped by multiple columns. For example, table t may also contain column r, a column containing values representing regions. It is may be useful to generate a result set that summarizes sales by region, and for each region, sales date. Such a result set may be generated by referencing column r and d in the group-by clause, as illustrated by the following query.

SELECT d, r SUM (s)
FROM t
GROUP BY r, d

DISTINCT AGGREGATE FUNCTION

Another type of aggregate function exists: a distinct aggregate. The following illustrates a query including a distinct aggregate function.

SELECT mgr, deptno, count(DISTINCT job)
FROM emp
GROUP BY mgr, deptno

Execution of a query that includes a distinct aggregate function, such as the preceding query, removes duplicate records (since the aggregate function specifies "DISTINCT" records), and applies the aggregate function to the resulting records. The subset of rows that are included in the final query result set are obtained from the GROUP BY columns (i.e., mgr and deptno) and the measure (job) of the distinct aggregate function.

ROLLUP OPERATOR

Another useful way to provide aggregate information is to generate one result set that groups data by various combinations of columns. For example, a result set may contain a set of rows grouped by region and date, and a set of rows grouped only by region. Such a result set may be generated by submitting a query that includes multiple subqueries operated upon by the union operator. While union queries may be used to generate a result set with multiple groupings, they can be very tedious to write. The programmer of the subquery must write a subquery for each desired grouping, which may become extraordinarily burdensome when the number of groupings desired is relatively large. Furthermore, such queries are very inefficient to execute, as some tables are accessed multiple times.

To avoid this burden, SQL defines extended group-by operators. Extended group-by operators include cube, rollup, and grouping sets. The group-by operators are used to specify groupings that include various combinations of the columns specified as arguments to the operators. For example, using the rollup operator, a query may be written as follows.

SELECT year, quarter, month, SUM(sales)
FROM fact.time
WHERE fact.tkey=time.tkey
GROUP BY rollup(year, quarter, month).

According to techniques that employ sort-based algorithms, execution of this query sorts data produced by the FROM and WHERE clauses on three columns (year, quarter, and month) specified in the GROUP BY clause, in order to logically group the records for efficient aggregation on the column (sales) specified in the aggregate function (SUM). The rollup operator aggregates data across levels specified as the keys (or columns) of the rollup operator, specified in the GROUP BY line. For example, "GROUP BY rollup(year, quarter, month)" produces aggregated results on the following groups:

(year, quarter, month);
(year, quarter);
(year); and
( ).

Note that a rollup on n columns produces n+1 groups. The grand total (referred to as the highest or coarsest) group is the () grouping, and the base (referred to as the lowest or finest) group is the (year, quarter, month) grouping.

ROLLUP OPERATOR WITH DISTINCT AGGREGATE FUNCTION

Processing distinct aggregates typically involves two steps, that is, eliminating duplicate rows and aggregating the resulting data. Computing a distinct aggregate with a rollup on n columns requires distinct elimination and aggregation in n+1 groups. For example, consider the following query.

SELECT year, quarter, month, SUM (DISTINCT sales)
FROM fact, time
WHERE fact.tkey=time.tkey
GROUP BY rollup (year, quarter, month).

Previously, evaluation of this query would require join of the fact and time tables and multiple sorts and aggregations, according to the distinct aggregate function and the rollup operator. For example, the join of the fact and time tables would be sorted on (year, quarter, month, sales), duplicates in "sales" column are eliminated since it is a distinct aggregate function, and the resulting data aggregated according to the SUM function. Then the join of the fact and time tables would be sorted on (year, quarter, sales), duplicates eliminated, and aggregated; and similarly for the (year, sales) and the (sales) groupings. Thus, as applied to the query above, this method requires a table join, and sorting and aggregating data n+1, or four, times. This is a computationally expensive process, primarily due to the number of sorts that need to be performed.

In addition, all of the groupings produced by the rollup operation need to be joined together. For example, the above query would require four subqueries combined with UNION ALL operators. Joins are computationally expensive, hence, this method of evaluating the query is inefficient.

One approach to this challenge is to materialize the join of all tables in a FROM clause into a temporary table and to compute the groups therefrom. This may be less computationally expensive than the redundant join process described above, but it directs the burden of optimization on the user or analytical application.

Based on the foregoing, it is clearly desirable to provide a scalable mechanism for efficiently computing database queries with a rollup operator and a distinct aggregate function.

SUMMARY OF THE INVENTION

Methods are provided for efficiently evaluating database queries that include a rollup operator and a distinct aggregate function.

According to one embodiment, using a sequence of sorts, duplicate record elimination performed by sorts at lower, or finer, levels of the rollup is taken advantage of by subsequent sorts on higher levels of the rollup. Hence, when moving from one rollup level to the next coarser level, there are fewer data records to sort and from which to eliminate duplicates. In addition, using parallel evaluation, the measure of an aggregate function is included as a partitioning key when sending data from one data flow operation to the next data flow operation of a query execution plan.

According to one embodiment, wherein the database query includes a rollup operator and two or more aggregate functions, a sequence of sorts is used to provide certain computational efficiencies, as described above. In addition, a sorting process is used in which each record is expanded into a plurality of records (herein referred to as expanded records) such that each corresponds to a particular aggregate function. The expanded records are sorted based in part on the corresponding aggregate function, and the aggregate functions computed therefrom. In one embodiment, using parallel evaluation, the sorted records are partitioned based on assigned measure codes that are associated with the aggregate function to which each expanded record corresponds and on corresponding values, prior to sending records from one data flow operation to another data flow operation of a query execution plan. In another embodiment, the records are partitioned based on the grouping field keys of the rollup operator prior to sending to the third data flow operation.

Various implementations of the techniques described are embodied in methods, apparatus, and in computer-readable media.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A–1I illustrate working or result tables at various times during evaluation of an exemplary query, particularly;

FIG. 1A illustrates the original state of a table, entitled TIME, which is the subject of a query including a rollup operator and a distinct aggregate function;

FIG. 1B illustrates a table, entitled TIME1, sorted by year, quarter, month, and sales;

FIG. 1C illustrates a table, entitled TIME2, with distinct records sorted by year, quarter, month, and sales;

FIG. 1D illustrates a table, entitled TIME3, with distinct records sorted by year, quarter, and month, summed on the sales field;

FIG. 1E illustrates a table, entitled TIME4, resulting from sorting table TIME2 of FIG. 1C, sorted by year, quarter, and sales;

FIG. 1F illustrates a table, entitled TIME5, with distinct records sorted by year and quarter, summed on the sales field;

FIG. 1G illustrates a table, entitled TIME6, resulting from sorting table TIME4 of FIG. 1E, sorted by year and sales according to a rollup operator, with duplicate records eliminated according to a distinct aggregate function FIG. 1H illustrates a table, entitled TIME7, with distinct records sorted by year, summed on the sales field;

FIG. 1I illustrates a table, entitled TIME8, resulting from sorting table TIME6 of FIG. 1G, sorted by sales according to a rollup operator, with duplicate records eliminated according to a distinct aggregate function;

FIG. 1J illustrates a table, entitled TIME9, with the sum of distinct values in the sales field;

FIGS. 2A–2S illustrate working or result tables at various times during evaluation of another exemplary query, particularly;

FIG. 2A illustrates the original state of a table, entitled TIME, which is the subject of a query including a rollup operator and two distinct aggregate functions;

FIG. 2B illustrates a table, entitled TIME_P0, that includes the expanded records of the records that were assigned to slave P0, sorted by year, quarter, and month;

FIG. 2C illustrates a table, entitled TIME_P1, including the expanded records of the records that were assigned to slave P1, sorted by year, quarter, and month;

FIG. 2D illustrates a table, entitled TIME_P0_OUT, that includes the results of a process on table TIME_P0 of FIG. 2B, including sorting by (year, quarter, month, code, value) and eliminating duplicate records;

FIG. 2E illustrates a table, entitled TIME_P1_OUT, that includes the results of a process on table TIME_P1 of FIG. 2C, including sorting by (year, quarter, month, code, value) and eliminating duplicate records;

FIG. 2F illustrates a table, entitled TIME_P2_IN, that includes partitioned data passed to slave P2 of stage 2, sorted by (year, quarter, month, code, value);

FIG. 2G illustrates a table, entitled TIME_P3_IN, that includes partitioned data passed to slave P3 of stage 2, sorted by (year, quarter, month, code, value);

FIG. 2H illustrates a table, entitled TIME_P2_OUT, that is an output table from slave P2 according to one level of a rollup operator;

FIG. 2I illustrates a table, entitled TIME_P3_OUT, that is an output table from slave P3 according to one level of a rollup operator;

FIG. 2J illustrates a table, entitled TIME_P2_IN1, that is a serial sort of table 212 of FIG. 2F on (year, quarter, code, value);

FIG. 2K illustrates a table, entitled TIME_P2_OUT1, that is an output table with results of both aggregate functions grouped by (year, quarter) according to one level of the rollup operator;

FIG. 2L illustrates a table, TIME_P3_IN1, that is a serial sort of table 214 of FIG. 2G on (year, quarter, code, value);

FIG. 2M illustrates a table, entitled TIME_P3_OUT1, that is an output table with results of both aggregate functions grouped by (year, quarter) according to one level of the rollup operator;

FIG. 2N illustrates a table, entitled TIME_P2_IN2, that is a sort of table TIME_P2_IN1 of FIG. 2J by (year, code, value);

FIG. 2O illustrates a table, entitled TIME_P2_OUT2, which is an output table with results of both aggregate functions grouped by (year) according to one level of the rollup operator;

FIG. 2P illustrates a table, entitled TIME_P3_IN2, that is a sort of table TIME_P3_IN1 of FIG. 2L by (year, code, value);

FIG. 2Q illustrates a table, entitled TIME_P3_OUT2, which is an output table with results of both aggregate functions grouped by (year) according to one level of the rollup operator;

FIG. 2R illustrates a table, entitled TIME_OUTPUT1, which depicts an output table grouped by (year, quarter) with data aggregated according to each of the two distinct aggregate functions;

FIG. 2S illustrates a table 238, entitled TIME_OUTPUT2, which depicts an output table grouped by (year), with data aggregated according to each of the two distinct aggregate functions;

DETAILED DESCRIPTION

Figure 2A:
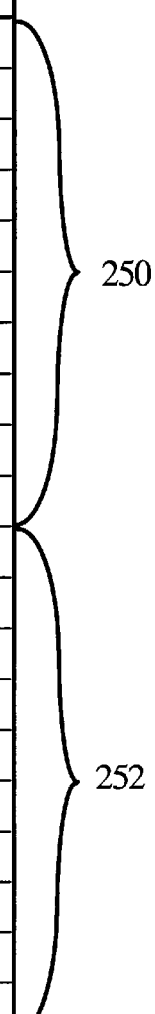

A method and system for efficiently evaluating database queries including rollups and distinct aggregates is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Processing a Rollup Operator with an Aggregate Function

A query that includes an aggregate function and a rollup operator follows.

SELECT year, quarter, month, SUM(sales)
FROM fact, time
WHERE fact.timekey=time.timekey
GROUP BY rollup(year, quarter, month).

According to a sort-based algorithm, execution of this query sorts data obtained from two tables (fact and time), after joining them based on the condition specified in the WHERE clause. The rollup operator aggregates data across levels specified as the arguments (or columns) of the rollup operator, specified in the GROUP BY line.

Stepping through the process, data is first sorted on (year, quarter, month), rows from the sorted data are accessed to aggregate sales for this level (L3), and result row(s) are output. In addition, when each row from the sorted data is accessed, it is determined whether that row belongs to a different group at the next higher level (L2=year, quarter). That is, if the row has a different value for "year, quarter" than the previous row accessed, then it belongs to a new group for L2. If the row does not start a new group, then the row's value is applied to a buffer for L2. Whenever the row belongs to a different group, aggregation is completed for that level (L2) for the current group, and that result can be output and applied to the next level, L1. The new row now starts the new group for level L2.

In general, for each row read from the sorted data, it is determined in which column it differs from the previous row, which dictates at which level the row should be aggregated for output. The process is repeated until all rows are read from the sort. Accordingly, a rollup can be computed with one scan of the sorted base data, advantageously offering computationally efficient processing.

Processing a Rollup Operator with a Distinct Aggregate Function by Using a Sequence of Sorts As described above, conventional processing of distinct aggregate functions typically involves two steps: eliminating duplicate records and aggregating the resultant data. Thus, computing a distinct aggregate with a rollup on n columns typically requires distinct elimination and aggregation of n+1 groupings, with each grouping requiring computation of identical joins.

Embodiments of the invention take advantage of duplicate record elimination processing performed on previous, or finer, levels in eliminating duplicate records at a current, or coarser, level. Hence, when moving from one rollup level to the next coarser level, there are fewer data records to sort with respect to the relevant grouping column for that level, and thus also fewer duplicate data records to eliminate for computing distinct values. This process of one sort feeding into another sort is referred to as a sequence of sorts. Advantageously, using a sequence of sorts provides a more efficient evaluation of the rollup operator than do prior evaluation techniques.

Furthermore, non-distinct aggregates such as inverse distribution, hypothetical rank, and first/last aggregates behave differently than distinct aggregates. Nevertheless, according to embodiments, above-mentioned aggregates can also be efficiently evaluated according to the technique described above.

Example-Sequence of Sorts

Techniques for evaluating database queries including rollup and distinct aggregate functions, as described herein as embodiments of the invention, shall now be described with reference to an example illustrated in FIGS. 1A through 1G. FIGS. 1A–1G illustrate working (pseudo-table) or result tables at various times during evaluation (or computation) of an exemplary query.

FIG. 1A illustrates the original state of a table 102, entitled TIME, which is the subject of a query including a rollup operator and a distinct aggregate function, as follows.

SELECT year, quarter, month, SUM(DISTINCT Sales)
FROM TIME
GROUP BY ROLLUP(year, quarter, month)

According to the rollup operator, execution of this query will produce results (summation of distinct Sales records) grouped as follows, from lowest level to highest level:

(year, quarter, month);

(year, quarter);

(year); and ( ).

Note that in this example, the TIME table is depicted as a base table, but the data could be configured as a join of multiple tables (e.g., fact table and multiple dimension tables in a star schema).

As described above, an initial step in evaluating this type of query is to sort the base table according to the query. In this case, the TIME table is first sorted by (year, quarter, month, sales), the lowest level sort associated with the rollup operator. FIG. 1B illustrates a table 104, entitled TIME1, sorted by year, quarter, month, and sales.

In furtherance of the distinct aggregate function, duplicate records from TIME1 are eliminated. Note that duplicates can be eliminated as sorting is performed, i.e., sorting and duplicate elimination are done together, not as separate steps. FIG. 1C illustrates a table 106, entitled TIME2, with distinct records sorted by year, quarter, month, and sales. Note that duplicate records 150–160 of table 104 are eliminated and thus do not appear in table 106, which includes distinct records only.

Next, according to the distinct aggregate function, SUM (DISTINCT sales), the sales field from TIME2 is summed for records with the same year, quarter, and month. FIG. 1D illustrates a table 108, entitled TIME3, with distinct records sorted by year, quarter, and month, summed on the sales field. As shown, the two records depicted as 162 in table 106 of FIG. 1C, are summed to produce record 168 in table 108; the two records depicted as 164 in table 106 of FIG. 1C, are summed to produce record 170 in table 108; and the two records depicted as 166 in table 106 of FIG. 1C, are summed to produce record 172 in table 108. Table 108 (TIME3) is one of four result tables produced by the illustrative query, that is, the lowest level grouping: (year, quarter, month, SUM(DISTINCT sales)).

According to an embodiment of the invention, the next higher level sort (year, quarter, sales) that is necessary to compute the query is performed on records that have been previously sorted and duplicates eliminated, that is, a lower level sort. In this example, the second sort is performed on table 106 (TIME2; 13 records). Advantageously, execution of the query according to this embodiment does not require returning to the original table 102 (TIME; 19 records) to perform the next level of sort. Hence, fewer records need to be sorted, which provides computational savings, and therefore, a more efficient sort. Consequently, this sequence of sorts technique provides a more efficient overall query computation.

FIG. 1E illustrates a table 110, entitled TIME4, resulting from sorting table 106 of FIG. 1C, sorted by year, quarter, and sales according to the rollup operator, with duplicate records eliminated according to the distinct aggregate function. Note that both the sort and duplicate elimination were performed between table 106 to table 110, as opposed to the illustration of the two steps separately as in the first sort between table 102 to table 104 followed by duplicate elimination to produce table 106.

FIG. 1F illustrates a table 112, entitled TIME5, with distinct records sorted by year and quarter, summed on the sales field. As shown, the two records depicted as 174 in table 110 of FIG. 1E, are summed to produce record 184 in table 112; the two records depicted as 176 in table 110 of FIG. 1E, are summed to produce record 186 in table 112; the two records depicted as 178 in table 110 of FIG. 1E, are summed to produce record 188 in table 112; and so on with records 180 of table 110 summed to produce record 190 of table 112 and records 182 of table 110 summed to produce record 192 of table 112. Table 112 (TIME5) is the second of four result tables produced by the illustrative query, that is, the grouping: (year, quarter, SUM(DISTINCT sales)).

The next higher level sort (year, sales) in computing the query is performed on the records that have been previously sorted and duplicates eliminated, that is, a lower level sort. In this example, the third sort is performed on table 110 (TIME4; 12 records). Advantageously, execution of the query according to this embodiment does not need to return to the original table 102 (TIME; 19 records) to perform the next level of sort. Hence, fewer records need be sorted, which provides computational savings, and therefore, a more efficient sort. Consequently, this sequence of sorts technique provides a more efficient overall query computation.

To complete this example query evaluation, FIG. 1G illustrates a table 114, entitled TIME6, resulting from sorting table 110 of FIG. 1E by year and sales according to the rollup operator, with duplicate records eliminated according to the distinct aggregate function. FIG. 1H illustrates a table 116, entitled TIME7, with distinct records sorted by year and summed on the sales field. Table 116 (TIME7) is the third of four result tables produced by the illustrative query, that is, the grouping: (year, SUM(DISTINCT sales)). Finally, FIG. 1I illustrates table 118, entitled TIME8, resulting from sorting table 114 of FIG. 1G by sales according to the rollup operator, with duplicate records eliminated according to the distinct aggregate function. FIG. 1J illustrates table 120, entitled TIME9, with distinct records summed on the sales field. Table 120 is the fourth of four result tables produced by the illustrative query, that is, the aggregate grouping: SUM(DISTINCT sales), depicting the sum of the distinct sales records from the original table 102.

Parallel Evaluation with Aggregate Measure Partitioning Keys

According to one embodiment, a two-stage (producer-consumer) execution model is utilized in processing a query containing a distinct aggregate function and a rollup operator. The actual execution of the query may have more than two stages, but the two stages referred to describe the relationship in which the output from one stage (producer) is the input to the next stage (consumer) and in which only two stages are active at any point in time. In this model, a set of processes (sometimes called slaves) are assigned to perform computations with respect to each stage, thus, at any point in time, one set of slaves is the producer and one set of slaves is the consumer awaiting data from the producer. Slaves at each stage work independently of other slaves working at the same stage, and each slave is assigned a particular portion of a table or particular records with which to work. Once the first stage producer slaves are finished with processing, they become third stage consumer slaves awaiting data from the second stage slaves. This process continues until all stages of the query computation are completed. To implement this parallel mode of execution for a query, a query execution plan is divided into different stages. Each stage is referred to as a data flow operation (DFO).

Execution of a rollup operator is inherently serial. Hence, data partitioning on rollup keys is not useful because a rollup operator cannot be computed strictly in parallel. Therefore, in one embodiment, a rollup operator is effectively parallelized based on the aggregate function. That is, processing of each aggregate function is assigned to slaves, which operate on a portion of the tables that are the subject of the query. The results from each of the slaves are then collected to return resulting rows.

Parallel evaluation of a rollup grouping with distinct aggregates can occur in three stages. At stage 1, the fact table and the associated dimension tables are scanned, joined, sorted, and elimination of duplicate records is performed on the base tables specified in the query so that less data is forwarded to stage 2. Partitioning, which is a mechanism for sending rows of data from one stage to the next stage, is implemented for computational efficiency. To obtain efficient parallelization, in one embodiment, the values associated with the measure of an aggregate function (sometimes referred to herein as the argument) are included as a partitioning key. That means that all records with a given measure from the stage 1 result are sent to the same stage 2 slave. In one embodiment, the aggregate measure partitioning occurring between stages 1 and 2 is a hash partitioning. Other embodiments utilize range partitioning. This type of partitioning results in even better computational load balancing than does solely assigning rows based on the aggregate computation to the slaves.

Furthermore, if the query comprises more than one distinct aggregate function, each stage 2 slave gets records from stage 1 corresponding to an aggregate and measure combination. Hence, at stage 2, duplicates can be removed across all levels of the rollup operator and the resulting rows aggregated, as described above using sequence of sorts across all levels of the rollup. Note that at stage 1, duplicates occurring within the records processed by a particular slave are eliminated, but when data is partitioned based on an aggregate function and aggregate measure values and forwarded to stage 2, there may still be duplicate records from different stage 1 slaves. Hence, stage 2 performs duplicate elimination before aggregation. With parallelization, the results obtained from each slave at stage 2 are partial and are subsequently combined with the results from the other stage 2 slaves. At stage 3, collecting and combining the results from each stage 2 slave completes the aggregation.

In one embodiment, partitioning that occurs between stages 2 and 3 is on grouping keys and can utilize a hash or range partitioning. In one embodiment, partitioning that occurs between stages 2 and 3 is on a grouping identifier that uniquely identifies the groupings produced by the rollup operator. In another embodiment, partitioning that occurs between stages 2 and 3 is on grouping keys and a grouping identifier. Refer to U.S. patent application Ser. No. 10/077,828 entitled "Evaluation of Hierarchical Cubes By Nesting Rollups", for methods for distinguishing groupings using grouping identifiers. Note that the present invention is independent of any particular method for distinguishing groupings, and therefore is not limited to the teachings described in the application referenced above.

In one embodiment, bit-vectors are used to uniquely identify the groupings produced by the rollup operator. For example, for rollup (a,b,c), a three-bit vector is used in which the first bit corresponds to the "a" key, the second bit corresponds to the "b" key, and the third bit corresponds to the "c" key, and so on. This technique produces the following results, in which a "0" represents the presence of a key in the grouping and a "1" represents the absence of that key from the grouping. The bit-vectors can be converted to base-10 equivalents, which are used to uniquely identify the groupings.

| GROUPING | bit-vector | base-10 equivalent |
|---|---|---|
| (a, b, c) | 000 | 0 |
| (a, b) | 001 | 1 |
| (a) | 011 | 3 |
| () | 111 | 7 |

Inverse distribution aggregates, for example, percentile_cont (percentile continuous) and percentile_disc (percentile discrete), require special handling. Unlike distinct aggregates, inverse distribution aggregate processing does not require duplicate record elimination. In addition, results cannot be computed from partial results. Therefore, two changes are applied to the parallel evaluation model described above. First, stage 1 slaves do not eliminate duplicates based on measure values of inverse distribution aggregate functions. Second, data partitioning between stages 1 and 2 occurs only on aggregate functions, not on the aggregate measures, since inverse distribution functions cannot be computed by combining partial results. This means that each stage 2 slave is responsible for processing a particular aggregate function based on all of the rows of the base tables that are required to compute its respective aggregate function.

Example-Parallel Evaluation with Aggregate Measure Partitioning Keys

Techniques for parallel evaluation of database queries including rollup and distinct aggregate functions, as described herein as embodiments of the invention, shall now be described with reference to an example illustrated in FIGS. 2A through 2S. FIGS. 2A–2S illustrate working or result tables at various times during evaluation of an exemplary query.

FIG. 2A illustrates the original state of a table 202, entitled TIME, which is the subject of a query including a rollup operator and two distinct aggregate functions, as follows.

SELECT year, quarter, month, SUM(DISTINCT Sales), COUNT(DISTINCT Profits)
FROM TIME
GROUP BY ROLLUP(year, quarter, month)

According to the rollup operator, execution of this query will produce results grouped as follows, from lowest level to highest level:

(year, quarter, month);
(year, quarter);
(year); and
().

Within each grouping in a level, duplicate records in the sales and profits columns are eliminated and the resulting records aggregated according to the respective aggregate functions. Hence, one column in the result set for a particular grouping level will contain summations of distinct sales records and another column in the result set will contain counts of distinct profit records at the same grouping level. Note that in this example, the TIME table is depicted as a base table, but the data could be configured as a join of multiple tables (e.g., a fact table and multiple dimension tables in a star schema). Note also that the table depicted in FIG. 2A is sorted by year, for purposes of the example. Use or practice of the invention is not limited to use with sorted base data tables.

As described above, using parallel evaluation of the query in accordance with embodiments of the invention, the query computation plan is broken into stages, or data flow operations. Stage 1 entails scanning and sorting the TIME table 202 at the lowest level based on the rollup operator, and eliminating duplicates based on measures for each of the distinct aggregate functions. In effect, two sorts are performed, that is, by (year, quarter, month, sales) and by (year, quarter, month, profits). In this example, two process slaves are utilized. Thus, during stage 1, slave P0 is assigned a portion of table 202 to process as depicted by the group of records 250, and slave P1 is assigned a different portion of table 202 to process as depicted by the group of records 252.

In one embodiment, as part of the parallel evaluation process each slave expands each assigned data record into the same number of records as there are distinct aggregate functions. In this example, slaves P0 and P1 expand each assigned record into two records, one including the sales measure and the other including the profits measure. In addition, the slaves assign a code to identify to which aggregate measure each of the records applies. FIG. 2B illustrates a table 204, entitled TIME_P0, that includes the expanded records of the records that were assigned to slave P0, sorted by year, quarter, and month. Table 204 includes a measure field 256 for measure values, that is, either the value in the sales field or the profits field of table 202. Table 204 also includes a code field 254 for the code, described above, associated with the specific aggregate measure for each record. FIG. 2C illustrates a table 206, entitled TIME_P1, including the expanded records of the records that were assigned to slave P1, sorted by year, quarter, and month. Table 206 includes a measure field 256 for measure values, that is, either the value in the sales field or the profits field of table 202. Table 206 also includes a code field 254 for the code, described above, associated with the specific aggregate measure for each record. In this example, a "1" code indicates a record containing the sales measure and thus associated with the SUM(DISTINCT sales) function, and a "2" code indicates a record containing the profits measure and thus associated with the COUNT(DISTINCT profits) function.

Slave P0 processes table 204 (FIG. 2B) by sorting by (year, quarter, month, code, value) and eliminating duplicate records, in furtherance of computing the aggregate functions. FIG. 2D illustrates a table 208, entitled TIME_P0_OUT, which includes the results of this process. Duplicate records of table 204 are depicted in FIG. 2B as rows 258–262, rows 264 and 266, rows 268 and 270, and rows 272 and 274. One or more of the records from each set of duplicates is eliminated in processing to table 208, resulting in only unique records. In parallel with the processing of slave P0, slave P1 processes table 206 (FIG. 2C) by sorting by (year, quarter, month, code, value) and eliminating duplicate records, in furtherance of computing the aggregate functions. FIG. 2E illustrates a table 210, entitled TIME_P1_OUT, which includes the results of this process. Duplicate records of table 206 are depicted in FIG. 2C as rows 276 and 278, rows 280–284, rows 286 and 288, and rows 290 and 292. Again, one or more of the records from each set of duplicates is eliminated in processing to table 210.

Stage 2, or the second data flow operation, involves two additional processing slaves, P2 and P3, which were consumers awaiting the output from the producer slaves of stage 1, that is, P0 and P1. Stage 2 essentially entails completing the duplicate record elimination and computing the aggregation across all levels of the rollup operator, based on the data processed by the stage 1 slaves. According to an embodiment of the invention, partitioning is employed when passing data from stage 1 to stage 2. In one embodiment, the data from stage 1, that is tables 208 (TIME_P0_OUT) and 210 (TIME P1_OUT), is passed to the slaves of stage 2 with partitioning by the code (CODE column) associated with the aggregate functions and their respective measure values (VALUE column). Thus, equivalent code/measure pairs are distributed to the same stage 2 slave, thereby providing better load balancing and a better degree of parallelization than merely assigning to a slave based on aggregate computation.

FIG. 2F illustrates a table 212, entitled TIME_P2_IN, that includes the partitioned data (randomly selected, for this example) passed to slave P2 of stage 2. FIG. 2G illustrates a table 214, entitled TIME_P3_IN, that includes the partitioned data (randomly selected, for this example) passed to slave P3 of stage 2. Tables 212 and 214 are presented as sorted by (year, quarter, code, value). Whether the data of tables 212 and 214 is sorted by stage 1 slaves or stage 2 slaves is not a limitation of the invention, for implementations can comply with either scheme. Slaves P2 and P3 process portions of the two aggregate functions across each level of the rollup operator. Note that the use or practice of the invention is not limited, at this stage, to random distribution of data from one stage to the next, but is presented as such merely for purposes of the example. Contrarily, distribution of data from one stage to the next is not limited to a structured distribution, other than the partitioning by aggregate function code and measure according to one embodiment.

FIG. 2H illustrates a table 216, entitled TIME_P2_OUT, which is an output table from slave P2 according to the rollup operator. Table 216 is not necessarily a stand-alone result table, for the records contained therein may be combined with other result records from other levels of the rollup operator, to generate a single comprehensive result table in response to the query. In addition, table 216 may be combined with other result records from other processing slaves operating at the same level of the rollup operator. Table 216 includes data sorted by (year, quarter, month), and also includes aggregation fields containing data aggregated according to the SUM(DISTINCT sales) and COUNT (DISTINCT profits) functions, at the lowest level of the rollup operator. This is one of the tables that passes to stage 3, which combines output data from the two slaves P2 and P3 of stage 2.

FIG. 2I illustrates a table 218, entitled TIME_P3_OUT, which is an output table from slave P3 according to the rollup operator. Table 218 is not necessarily a stand-alone result table, for the records contained therein may be combined with other result records from other levels of the rollup operator, to generate a single comprehensive result table in response to the query. In addition, table 218 is combined with result records from slave P2 operating at the same level of the rollup operator. Table 218 includes data sorted by (year, quarter, month), and also includes aggregation fields containing data aggregated according to the SUM (DISTINCT sales) and COUNT(DISTINCT profits) functions, at the lowest level of the rollup operator. Tables 216 and 218 are combined at stage 3, which will be described in reference to FIG. 2R below.

Stage 2 processing continues, whereby slaves P2 and P3 compute the next higher rollup levels based on the rollup operator, using the sequence of sorts method. FIG. 2J illustrates a table 220, entitled TIME_P2_IN1, that is a serial sort of table 212.(FIG. 2F) on (year, quarter, code, value). Duplicate records are presented in this table (shaded) for purposes of the example. Note that the process of sorting the data may also include the process of duplicate record elimination, together as one process. FIG. 2K illustrates a table 222, entitled TIME_P2_OUT1, that is an output table from slave P2, with results of both aggregate functions grouped by (year, quarter) according to one level of the rollup operator. The duplicate records of table 220 are eliminated in furtherance of the computation of the distinct aggregate functions.

FIG. 2L illustrates a table 224, entitled TIME_P3_IN1, that is a serial sort of table 214 (FIG. 2G) on (year, quarter, code, value). Duplicate records are presented in this table (shaded) for purposes of the example. Note that the process of sorting the data may also include the process of duplicate record elimination, together as one process. FIG. 2M illustrates a table 226, entitled TIME_P3_OUT1, that is an output table from slave P3, with results of both aggregate functions grouped by (year, quarter) according to one level of the rollup operator. The duplicate record of table 224 is eliminated in furtherance of the computation of the distinct aggregate functions. Tables 222 and 226 are not necessarily stand-alone result tables, for the records contained therein may be combined with other result records from other levels of the rollup operator, to generate a single comprehensive result table in response to the query. Note also that tables 216, 218, 222, and 226 do not necessarily pass to stage 3 in the order introduced in this description.

Stage 2 processing continues to the next highest level of rollup, where slave P2 serial sorts table 220 (FIG. 2J) by (year, code, value) to produce table 228 of FIG. 2N, entitled TIME_P2_IN2. Once again, duplicate records are presented in this table (shaded) for purposes of the example, but embodiments of the invention can perform the sorting and duplicate record elimination as a single process. FIG. 2O illustrates a table 230, entitled TIME_P2_OUT2, which is an output table from slave P2, with results of both aggregate functions grouped by (year) according to one level of the rollup operator. The duplicate records of table 228 are eliminated in furtherance of the computation of the distinct aggregate functions.

FIG. 2P illustrates a table 232, entitled TIME_P3_IN2, which is a serial sort of table 224 (FIG. 2L) on (year, code, value), with duplicate records presented in bold type. Once again, duplicate records are presented in this table as shaded for purposes of the example, but embodiments of the invention can perform the sorting and duplicate record elimination as a single process. FIG. 2Q illustrates a table 234, entitled TIME_P3_OUT2, which is an output table from slave P3, with results of both aggregate functions grouped by (year) according to one level of the rollup operator. The duplicate records of table 232 are eliminated in furtherance of the computation of the distinct aggregate functions. Tables 230 and 234 are not necessarily stand-alone result tables, for the records contained therein may be combined with other result records from other levels of the rollup operator, to generate a single comprehensive result table in response to the query.

The process of sorting on the results from the previous level of rollup, eliminating duplicates, and computing distinct aggregate functions, continues until all groupings of the rollup operator are computed by each slave P2 and P3.

The output tables from slaves P2 and P3 of stage 2, such as tables 216, 218, 222, 226, 230, and 234 are sent to stage 3 for combining into final output tables according to the rollup operator. Note that tables 216, 218, 222, 226, 230, and 234 do not necessarily pass to stage 3 in the order introduced in this description. Furthermore, according to one embodiment, the data is partitioned between stage 2 to stage 3. For example, data from both stage 2 slaves may be partitioned by rollup levels. That is, slave P0 of stage 3 receives tables 216 and 218, grouped by (year, quarter, month), and tables 230 and 234, grouped by (year); and slave P1 of stage 3 receives table 222 and 226, grouped by (year, quarter), and the output tables (not shown) grouped by (), i.e., the "all" grouping. Note that in the two-stage producer-consumer evaluation model being exemplified, the original producer slaves of stage 1, P0 and P1, are now again employed to process data at stage 3.

At stage 3, the slaves combine the data from tables produced by each slave of stage 2 to produce a final output table. FIG. 2R illustrates table 236 (generated by slave P1 of stage 3), entitled TIME_OUTPUT1, which depicts an output table grouped by (year, quarter) with data aggregated according to each of the two distinct aggregate functions. Table 236 combines tables 222 and 226 from slaves P2 and P3, respectively. FIG. 2S illustrates a table 238 (generated by slave P0 of stage 3), entitled TIME_OUTPUT2, which depicts an output table grouped by (year), with data aggregated according to each of the two distinct aggregate functions. Table 238 combines tables 230 and 234 from slaves P2 and P3, respectively. The remaining output tables, (year, quarter, month, SUM(DISTINCT sales), COUNT (DISTINCT profits)) and (SUM(DISTINCT sales), COUNT (DISTINCT profits)) are computed and output similarly, to complete computation of the database query. Tables 236 and 238 are not necessarily stand-alone result tables, for the records contained therein may be combined together and/or with other result records from other levels of the rollup operator, to generate a single comprehensive result table in response to the query.

This example process utilized sequence of sorts and parallel evaluation with aggregate measure and value partitioning keys to provide an efficient evaluation of a query including distinct aggregate functions and a group-by rollup operator.

Figure 3:
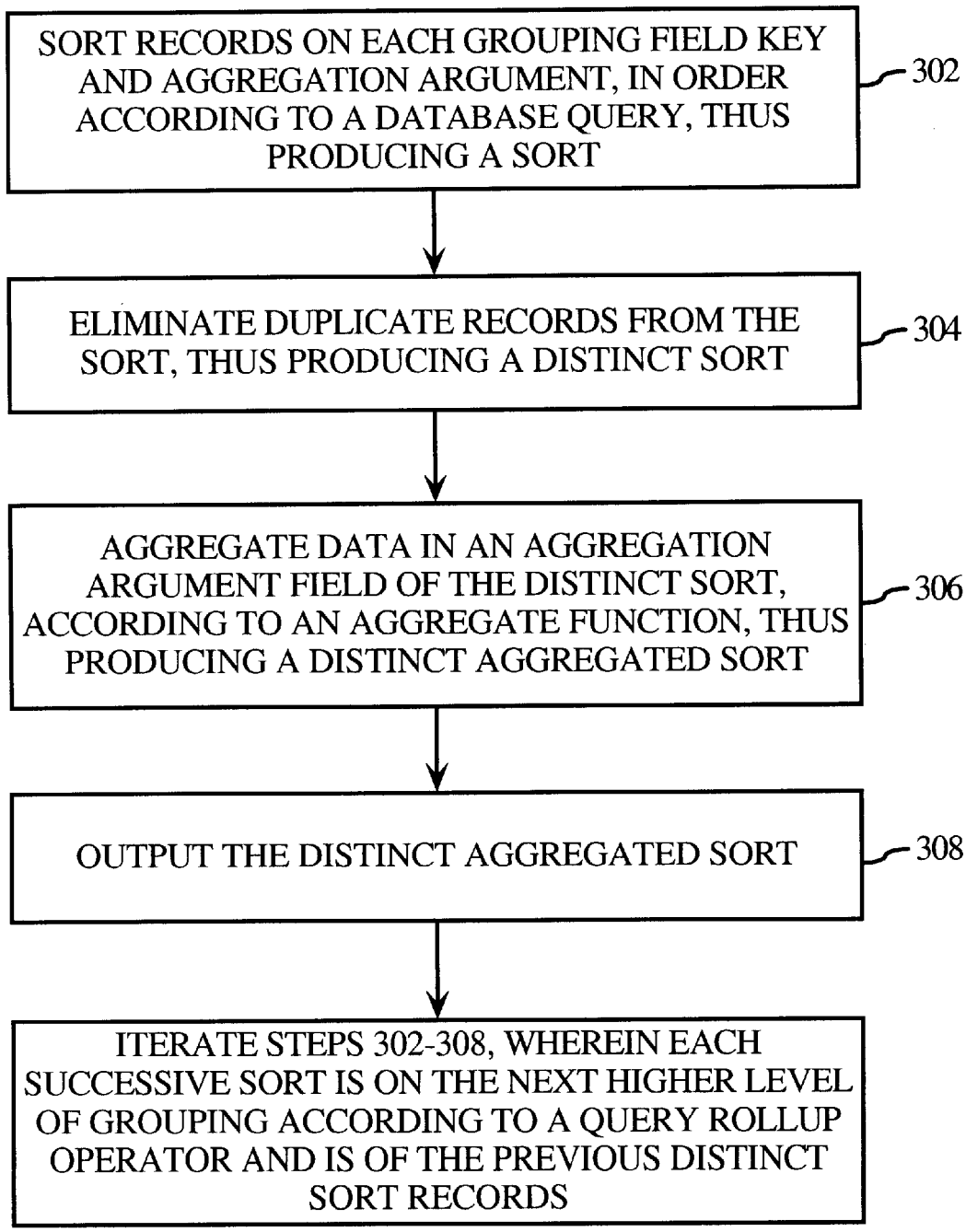
FIG. 3 is a flowchart illustrating a method for evaluating a query with rollup and distinct aggregate functions, according to an embodiment of the invention.

Method for Evaluating a Query with a Rollup Operator and a Distinct Aggregate Function FIG. 3 is a flowchart illustrating a method for evaluating a query with rollup and distinct aggregate functions, according to an embodiment of the invention. The following query will again be used for exemplary purposes:

SELECT year, quarter, month, SUM(DISTINCT Sales)
FROM TIME
GROUP BY ROLLUP(year, quarter, month).

According to the processes described and exemplified above, at step 302, database records are sorted on each of the grouping field keys (e.g., keys in GROUP BY clause) and the distinct aggregate argument, in order according to the query, thus producing a sort. For example, a sort of the TIME table by (year, quarter, month, sales), such as table 104 of FIG. 1B, is performed. At step 304, duplicate records are eliminated from the sort produced at step 302, thus producing a distinct sort, such as table 106 of FIG. 1C. According to one embodiment, sorting and duplicate elimination of data are performed together, that is, as a single step. Hence, practice of the invention is not limited to performing sorting of data and elimination of duplicate data in separate steps. At step 306, a distinct aggregated sort is produced by aggregating the data in the aggregate function field of the distinct sort, according to the aggregate function. For example, the sales field is summed according to the query above. Thus, at step 308, one of the query results, according to the rollup operator, is output. For example, the grouping (year, quarter, month, SUM(DISTINCT sales)), such as table 108 of FIG. 1D, is output. Steps 302–308 are iterated, such that each successive sort according to step 302 is performed on the next higher level of grouping according to the rollup operator, and is of the records produced by the previous (lower level) distinct sort. For example, table 106 is sorted to produce table 110 of FIG. 1E, table 110 is sorted to produce table 114 of FIG. 1G, and so on until all groupings are computed.

Hardware Overview

Figure 4:
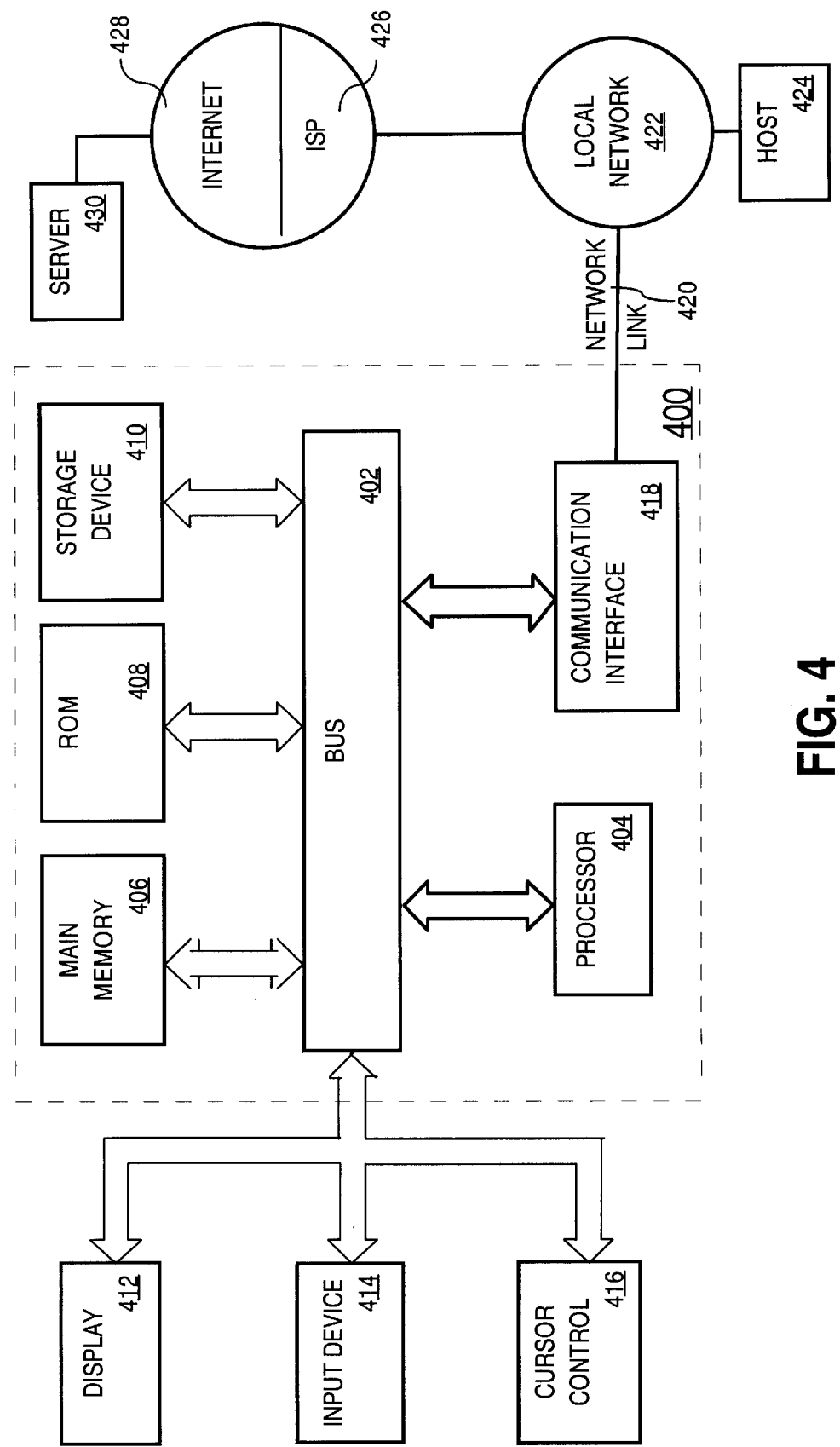
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, references have been made to the SQL database query language and examples of queries using SQL have been utilized throughout to aid in describing the invention. However, the techniques described herein are not limited to any database query language. For another example, the techniques described are based on the use of sort-based algorithms for computing rollup operators and aggregate functions. However, the techniques described herein are not limited to use with sort-based query evaluation algorithms, but may be used in conjunction with algorithms that do not group records by sorting. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for evaluating a database query that includes an aggregate function specifying aggregation of data in a field, specified by an aggregation argument, from distinct records and that includes a rollup operator specifying one or more grouping field keys for grouping of results, wherein a result group consisting of data grouped by all fields specified by the grouping field keys is the lowest level of grouping and a result group consisting of data grouped by no fields specified by the grouping field keys is the highest level of grouping, the method comprising the steps of:

for the lowest level of grouping, generating output by performing the aggregation on data retrieved from one or more base tables; and for each level of grouping other than the lowest level, generating output by performing the aggregation on a distinct sorted set of records from the previous level, wherein the distinct sorted set of records includes only unique records.

2. The method of claim 1 wherein the steps of generating outputs are performed using a parallel evaluation process, further comprising the steps of:

defining a first data flow operation of a query evaluation plan as a step of eliminating duplicates in the field specified by the aggregation argument from the one or more base tables;

processing by two or more producer processing slaves the first data flow operation;

partitioning results from each of the two or more producer processing slaves;

defining a second data flow operation of the query evaluation plan as a step of eliminating duplicates in the field specified by the aggregation argument for each level of the rollup operator using a sequence of sorts, wherein a first duplicate elimination is performed on a result produced from the first data flow operation and each other duplicate elimination is performed on a result produced from a preceding sort;

a step of aggregating on each sort corresponding to each level of the rollup operator according to the aggregate function;

processing by two or more consumer processing slaves the second data flow operation based on partitioned results; and defining a third data flow operation of the query evaluation plan as a step of aggregating for each level of the rollup operator by combining results produced by the step of aggregating from the second data flow operation.

3. The method of claim 2 wherein the step of partitioning results is based on the aggregation argument of the aggregate function.

4. The method of claim 2 comprising the step of:

partitioning results from each of the two or more consumer processing slaves based on the one or more grouping field keys specified by the rollup operator and on a grouping identifier.

5. The method of claim 2 wherein the query comprises two or more aggregate functions and wherein the step of partitioning results is based on the aggregation arguments of the two or more aggregate functions and values in fields corresponding to the aggregation arguments.

6. A method for evaluating a database query that includes an aggregate function specifying aggregation of data in a field, specified by an aggregation argument, from distinct records and that includes a rollup operator specifying one or more grouping field keys for grouping of results, wherein a result group consisting of data grouped by all fields specified by the grouping field keys is the lowest level of grouping and a result group consisting of data grouped by no fields specified by the grouping field keys is the highest level of grouping, the method comprising the steps of:

for the lowest level of grouping, eliminating one or more records that are duplicates of a record with respective values in one or more respective grouping fields and aggregation argument field, producing a distinct sort, wherein the grouping fields are specified by the grouping field keys and the aggregation argument field is specified by the aggregation argument;

aggregating, from the distinct sort, the data in the aggregation argument field according to the aggregate function, producing a distinct aggregated sort;

outputting the distinct aggregated sort according to the query; and for each level of grouping other than the lowest level, iterating the steps of eliminating, aggregating, and outputting on the distinct sort of the previous level.

7. A method for evaluating a database query that includes two or more aggregate functions specifying aggregation of data in a field, specified by an aggregation argument, from distinct records and that includes a rollup operator specifying one or more grouping field keys for grouping of results, wherein a result group consisting of data grouped by all fields specified by the grouping field keys is the lowest level of grouping and a result group consisting of data grouped by no fields specified by the grouping field keys is the highest level of grouping, the method comprising the steps of:

for records of one or more tables that are a subject of the query, generating a set of expanded records by expanding each record into a plurality of records wherein each expanded record of the set of expanded records corresponds to a particular aggregate function;

eliminating from the set of expanded records one or more records that are duplicates of an expanded record with respective values in one or more respective grouping fields and aggregation argument field, producing a distinct sort, wherein the grouping fields are specified by the grouping field keys and the aggregation argument field is specified by the aggregation argument; and computing from the distinct sort the two or more aggregate functions with results grouped according to the rollup operator.

8. The method of claim 7 wherein the step of generating a set of expanded records comprises:

assigning to each expanded record a measure code associated with the aggregate function to which the expanded record corresponds.

9. The method of claim 8 wherein the step of eliminating records comprises sorting the set of expanded records at least in part on the measure code.

10. The method of claim 7 wherein a query execution plan is divided into two or more data flow operations, each of two or more processing slaves are assigned part of the processing associated with at least one of the data flow operations and the two or more processing slaves process, in parallel, the associated data flow operation, and the processing comprises:

assigning to each expanded record a measure code associated with the aggregate function to which the expanded record corresponds;

partitioning results from each of two or more first processing slaves that process a first data flow operation, wherein partitioning is based on the measure codes;

assigning to each of two or more second processing slaves the processing associated with a second data flow operation; and processing by the two or more second processing slaves the second data flow operation based on partitioned results from the two or more first processing slaves.

11. The method of claim 10, wherein the step of partitioning results is based additionally on the values in a field specified by the aggregation argument corresponding to each of the two or more aggregate functions.

12. The method of claim 10, further comprising the steps of:

partitioning results from the two or more second processing slaves processing the second data flow operation based on the one or more grouping field keys of the rollup operator;

defining a third data flow operation for generating output rows by combining outputs for each of the levels of grouping from the two or more second processing slaves; and processing the third data flow operation based on partitioned results from the two or more second processing slaves.

13. The method of claim 12, wherein the step of partitioning results from the two or more second processing slaves is based on a bit-vector that uniquely identifies each result grouping specified by the one or more grouping field keys corresponding to the rollup grouping function.

14. The method of claim 7 wherein the step of computing comprises:
for the lowest level of grouping,
for each of the two or more aggregate functions, aggregating data from the distinct sort that is in a field specified by the aggregation argument corresponding to the particular aggregate function, producing distinct aggregated sorts;
outputting the distinct aggregated sorts according to the query; and
for each level of grouping other than the lowest level, iterating the steps of aggregating and outputting on the distinct sorts of the previous level.

15. The method of claim 14 wherein the step of generating a set of expanded records comprises:
assigning to each expanded record a measure code associated with the aggregate function to which the expanded record corresponds.

16. A computer-readable medium carrying one or more sequences of instructions for evaluating a database query that includes an aggregate function specifying aggregation of data in a field, specified by an aggregation argument, from distinct records and that includes a rollup operator specifying one or more grouping field keys for grouping of results, wherein a result group consisting of data grouped by all fields specified by the grouping field keys is the lowest level of grouping and a result group consisting of data grouped by no fields specified by the grouping field keys is the highest level of grouping, wherein execution of the one or more sequences of instructions by one or more processors causes the one or more processors to perform the steps of:
for the lowest level of grouping, generating output by performing the aggregation on data retrieved from one or more base tables; and
for each level of grouping other than the lowest level, generating output by performing the aggregation on a distinct sorted set of records from the previous level, wherein the distinct sorted set of records includes only unique records.

17. The computer-readable medium of claim 16 wherein execution of the one or more sequences of instructions by one or more processors causes the one or more processors to perform the steps using a parallel evaluation process, comprising the steps of:
defining a first data flow operation of a query evaluation plan as a step of eliminating duplicates in the field specified by the aggregation argument from the one or more base tables;
processing by two or more first processing slaves the first data flow operation;
partitioning results from each of the two or more first processing slaves; defining a second data flow operation of the query evaluation plan as
a step of eliminating duplicates in the field specified by the aggregation argument for each level of the rollup operator using a sequence of sorts, wherein a first duplicate elimination is performed on a result produced from the first data flow operation and each other duplicate elimination is performed on a result produced from a preceding sort;
a step of aggregating on each sort corresponding to each level of the rollup operator according to the aggregate function;

processing by two or more second processing slaves the second data flow operation based on partitioned results; and
defining a third data flow operation of the query evaluation plan as a step of aggregating for each level of the rollup operator by combining results produced by the step of aggregating from the second data flow operation.

18. The computer-readable medium of claim 17 wherein execution of the one or more sequences of instructions by one or more processors causes the one or more processors to perform the step of partitioning results by partitioning results based on the aggregation argument of the aggregate function.

19. The computer-readable medium of claim 17 wherein execution of the one or more sequences of instructions by one or more processors causes the one or more processors to perform the step:
partitioning results from each of the two or more consumer processing slaves based on the one or more grouping field keys specified by the rollup operator and on a grouping identifier.

20. The computer-readable medium of claim 17 wherein the query comprises two or more aggregate functions, and wherein execution of the one or more sequences of instructions by one or more processors causes the one or more processors to perform the step of partitioning results based on the aggregation arguments of the two or more aggregate functions and values in fields corresponding with the aggregation arguments.

21. A computer-readable medium carrying one or more sequences of instructions for evaluating a database query that includes two or more aggregate functions specifying aggregation of data in a field, specified by an aggregation argument, from distinct records and that includes a rollup operator specifying one or more grouping field keys for grouping of results, wherein a result group consisting of data grouped by all fields specified by the grouping field keys is the lowest level of grouping and a result group consisting of data grouped by no fields specified by the grouping field keys is the highest level of grouping, wherein execution of the one or more sequences of instructions by one or more processors causes the one or more processors to perform the steps of:
for records of one or more tables that are a subject of the query,
generating a set of expanded records by expanding each record into a plurality of records wherein each expanded record of the set of expanded records corresponds to a particular aggregate function;
eliminating from the set of expanded records one or more records that are duplicates of an expanded record with respective values in one or more respective grouping fields and aggregation argument field, producing a distinct sort, wherein the grouping fields are specified by the grouping field keys and the aggregation argument field is specified by the aggregation argument; and
computing from the distinct sort the two or more aggregate functions with results grouped according to the rollup operator.

22. The computer-readable medium of claim 21 wherein execution of the one or more sequences of instructions by one or more processors causes the one or more processors to:
perform the step of generating a set of expanded records by
assigning to each expanded record a measure code associated with the aggregate function to which the expanded record corresponds; and perform the step of eliminating records by sorting the set of expanded records at least in part on the measure code.

23. The computer-readable medium of claim 21 wherein a query execution plan for evaluating the database query is divided into two or more data flow operations, each of two or more processing slaves are assigned part of the processing associated with one of the data flow operations and the two or more processing slaves process, in parallel, the associated data flow operation, and wherein execution of the one or more sequences of instructions by one or more processors causes the one or more processors to perform the steps of:

assigning to each expanded record a measure code associated with the aggregate function to which the expanded record corresponds;

partitioning results from each of two or more first processing slaves that process the first data flow operation, wherein partitioning is based on the measure codes;

assigning to each of two or more second processing slaves the processing associated with the second data flow operation; and processing by the two or more second processing slaves the second data flow operation based on partitioned results from the two or more first processing slaves.

24. The computer-readable medium of claim 23, wherein execution of the one or more sequences of instructions by one or more processors causes the one or more processors to perform the step of partitioning results based additionally on the values in a field specified by the aggregation argument corresponding to each of the two or more aggregate functions.

25. The computer-readable medium of claim 23 wherein execution of the one or more sequences of instructions by one or more processors causes the one or more processors to perform the steps of:

partitioning results from the two or more consumer processing slaves processing the second data flow operation based on the one or more grouping field keys of the rollup operator;

defining a third data flow operation for generating output rows by combining outputs for each of the levels of grouping from the two or more consumer processing slaves; and processing the third data flow operation based on partitioned results from the two or more consumer processing slaves.

26. The computer-readable medium of claim 25 wherein execution of the one or more sequences of instructions by one or more processors causes the one or more processors to perform the step of partitioning results from the two or more consumer processing slaves based on a bit-vector that uniquely identifies each result grouping specified by the one or more grouping field keys corresponding to the rollup grouping function.

27. A computer apparatus comprising:

a memory; and one or more processors coupled to the memory and configured to execute one or more sequence of instructions for evaluating a database query that includes an aggregate function specifying aggregation of data in a field, specified by an aggregation argument, from distinct records and that includes a rollup operator specifying one or more grouping field keys for groupings of results, wherein a result group consisting of data grouped by all fields specified by the grouping field keys is the lowest level of grouping and a result group consisting of data grouped by no fields specified by the grouping field keys is the highest level of grouping, wherein execution of the one or more sequences of instructions by one or more processors causes the one or more processors to perform the steps of:

for the lowest level of grouping, generating output by performing the aggregation on data retrieved from one or more base tables; and for each level of grouping other than the lowest level, generating output by performing the aggregation on a distinct sorted set of records from the previous level, wherein the distinct sorted set of records includes only unique records.

28. A computer apparatus comprising:

a memory; and one or more processors coupled to the memory and configured to execute one or more sequence of instructions for evaluating a database query that includes two or more aggregate functions specifying aggregation of data in a field, specified by an aggregation argument, from distinct records and that includes a rollup operator specifying one or more grouping field keys for groupings of results, wherein a result group consisting of data grouped by all fields specified by the grouping field keys is the lowest level of grouping and a result group consisting of data grouped by no fields specified by the grouping field keys is the highest level of grouping, wherein execution of the one or more sequences of instructions by one or more processors causes the one or more processors to perform the steps of:

for records of one or more tables that are a subject of the query, generating a set of expanded records by expanding each record into a plurality of records wherein each expanded record of the set of expanded records corresponds to a particular aggregate function;

eliminating from the set of expanded records one or more records that are duplicates of an expanded record with respective values in one or more respective grouping fields and aggregation argument field, producing a distinct sort, wherein the grouping fields are specified by the grouping field keys and the aggregation argument field is specified by the aggregation argument; and computing from the distinct sort the two or more aggregate functions with results grouped according to the rollup operator.

* * * * *

UNITED STATES PATENT AND TRADEMARK OFFICE
CERTIFICATE OF CORRECTION

PATENT NO.         : 6,775,682 B1
APPLICATION NO. : 10/084642
DATED              : August 10, 2004
INVENTOR(S)       : Srikanth Bellamkonda et al.

It is certified that error appears in the above-identified patent and that said Letters Patent is hereby corrected as shown below:

On The Title Page
(75) Inventors:

Please delete "Srikanth Ballamkonda" and insert --Srikanth Bellamkonda--.

Signed and Sealed this

Third Day of July, 2007

JON W. DUDAS
*Director of the United States Patent and Trademark Office*